United States Patent
Sophinos et al.

(10) Patent No.: US 10,551,496 B2
(45) Date of Patent: Feb. 4, 2020

(54) SYSTEMS AND METHODS FOR VERIFYING PARTICIPATION IN A MEETING USING SOUND SIGNALS

(71) Applicant: COURSE KEY, INC., Wilmington, DE (US)

(72) Inventors: Lucas Sophinos, San Diego, CA (US);
Luan Nguyen, Santee, CA (US);
Michael Woo, San Diego, CA (US);
Ron Cruz, San Diego, CA (US);
Zachary Brody, San Diego, CA (US);
Fadi George, El Cajon, CA (US);
Fadee Kannah, El Cajon, CA (US);
Marc Barron, San Diego, CA (US);
Omar Miyazaki, San Diego, CA (US)

(73) Assignee: COURSE KEY, INC., Wilmington, DE (US)

( * ) Notice: Subject to any disclaimer, the term of this patent is extended or adjusted under 35 U.S.C. 154(b) by 0 days.

(21) Appl. No.: 15/999,709

(22) Filed: Aug. 20, 2018

(65) Prior Publication Data

US 2019/0056494 A1    Feb. 21, 2019

Related U.S. Application Data

(60) Provisional application No. 62/547,313, filed on Aug. 18, 2017.

(51) Int. Cl.
*G01S 15/04*    (2006.01)

(52) U.S. Cl.
CPC ................... *G01S 15/04* (2013.01)

(58) Field of Classification Search
CPC ........... G01S 15/04; G01S 15/74; G01C 1/10
USPC ........................................... 367/197
See application file for complete search history.

(56) References Cited

U.S. PATENT DOCUMENTS

| | | | | |
|---|---|---|---|---|
| 2012/0142324 A1* | 6/2012 | Kim | ..................... | H04M 3/568 455/416 |
| 2013/0308506 A1* | 11/2013 | Kim | ..................... | H04W 12/04 370/310 |
| 2017/0177423 A1* | 6/2017 | Bradley | ................. | G06F 9/542 |

* cited by examiner

*Primary Examiner* — Vernal U Brown
(74) *Attorney, Agent, or Firm* — Troutman Sanders LLP; James E. Schutz; Christopher C. Close, Jr.

(57) ABSTRACT

Systems and methods for verifying the presence of an attendee in an education session include providing, by a computer hardware processor, information for a codified sound to a leader of the education session, where the leader is located in a substantially enclosed space in which the education session is held. The codified sound represents a leader code. The codified sound is emitted from a first device associated with the leader. A sound signal is received by a second device associated with the attendee. An attendee code is determined from the sound signal received by the second device. The system, such as using the computer hardware processor or the second device, determines whether the attendee code matches the leader code.

14 Claims, 11 Drawing Sheets

SYSTEMS AND METHODS FOR VERIFYING PARTICIPATION IN A MEETING USING SOUND SIGNALS

CROSS REFERENCE TO RELATED APPLICATION

This application claims priority and a benefit under 35 U.S.C. 119(e) to U.S. Provisional Patent Application No. 62/547,313, entitled "Verifying Participation in a Meeting Using Sound Signals," filed 18 Aug. 2017. The disclosures of this prior application are hereby incorporated by reference as if fully set forth below.

TECHNICAL FIELD

Aspects of the present disclosure relate to systems and methods for verifying the presence of an attendee in an education session, and, more particularly, for systems and methods that include providing, by a computer hardware processor, information for a codified sound to a leader of the education session, where the leader is located in a substantially enclosed space in which the education session is held.

BACKGROUND

Software applications have become ubiquitous in all aspects of business and other interactions. For example, higher education classes use on-line applications for communicating and disseminating information between an instructor and students. Applications that take and track attendance, both web-based and those based on a personal electronic device, have also been developed. As the utility of software applications continues to grow, opportunities exist for providing improved and new functionality for coordinating meetings between people.

SUMMARY

Methods of verifying the presence of an attendee in an education session can include providing, by a computer hardware processor, information for a codified sound to a leader of the education session, where the leader is located in a substantially enclosed space in which the education session is held. The codified sound represents a leader code. The codified sound is emitted from a first device associated with the leader. A sound signal is received by a second device associated with the attendee. An attendee code is determined from the sound signal received by the second device. The system, such as using the computer hardware processor or the second device, determines whether the attendee code matches the leader code.

DETAILED DESCRIPTION OF THE EMBODIMENTS

Figure 1:
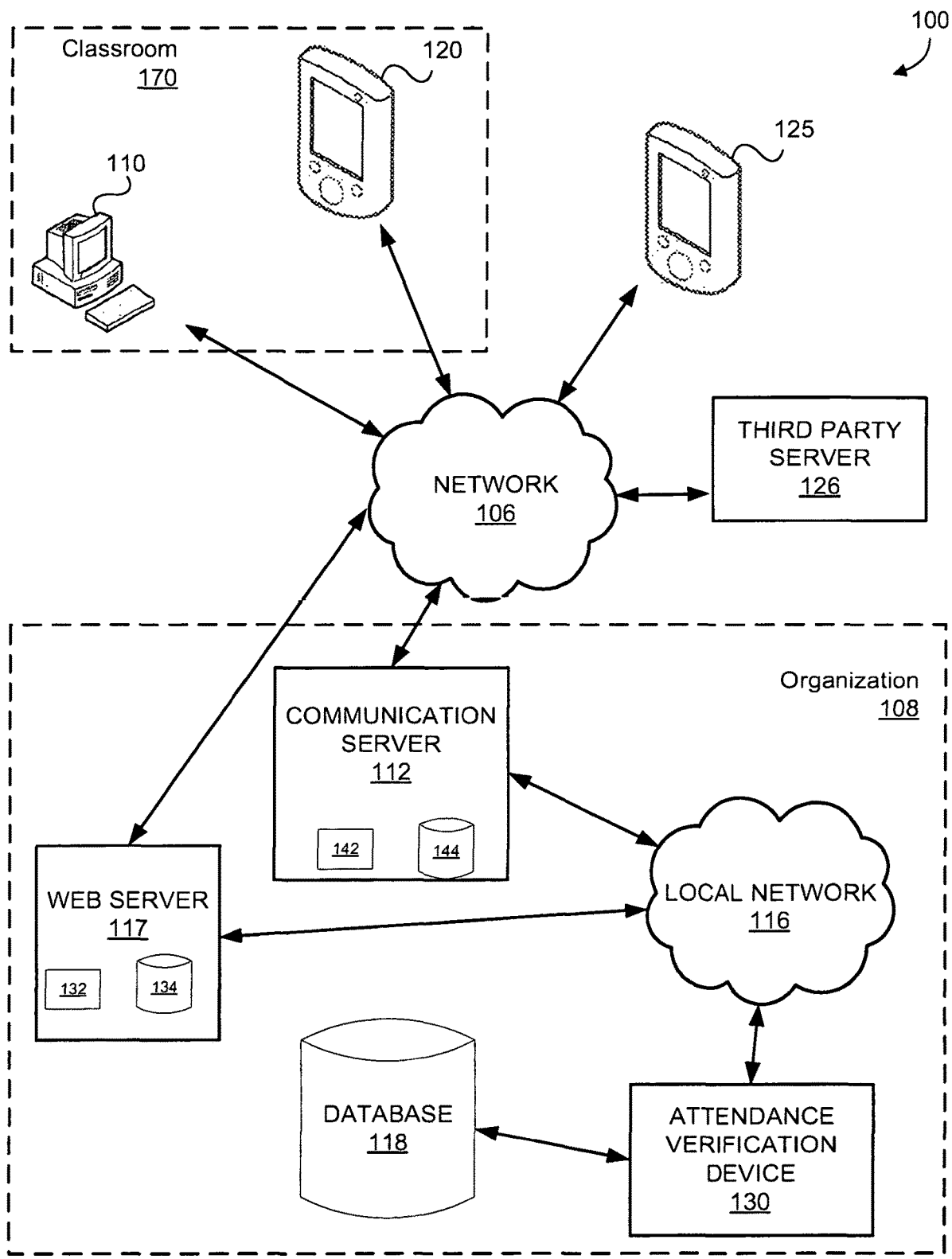
FIG. 1 shows a schematic of a system including a classroom where student attendance is to be verified, according to some embodiments.

Aspects of the present disclosure relate to systems and methods for verifying an attendee's attendance at an education session. The present disclosure can be understood more readily by reference to the following detailed description of exemplary embodiments and the examples included herein. Before the exemplary embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. But it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise.

The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the disclosed technology, for example.

In classroom lecture courses of various sizes, both professors and students experience issues in managing attendance, grades and general communication. The lack of personalization in the student experience, and restrictions placed on educators as a result of the time constraints and increasing enrollment rates, creates a need for tools to facilitate these classes. Methods and systems described herein enable verifying the presence of an attendee in a meeting, such as a student in an education session, in a secure way, using encoded sound signals. The device associated with a leader of the class transmits a specific sound signal that contains (e.g., is modulated with) a unique leader code. An attendee uses a device, such as their smartphone, to listen for the sound signal. The attendee's device processes the sound to extract a code. If the system verifies that the attendee code as determined by the attendee's device matches the leader code, the attendee's presence is confirmed. Validation of the code can occur using, for example, a computer server for the overall system, or on the student's device via the software application.

Detecting if a student is inside or outside a room is valuable because a specific student can then be authenticated based on a phone, tablet, laptop, desktop or other electronic device associated with the user. This can be used to ensure a student is in the physical space for any in-classroom activity, including attendance taking, group projects, assignments, quizzes, and exams. As will be appreciated by one of skill in the art, location detection systems of the present disclosure are able to detect if a student is inside or outside a classroom, in a reliable and low-cost manner, and without creating a queue. For example, the disclosed systems and methods can quickly check in a large number of students, such as 500 or more.

Although the present methods shall be described in terms of academic settings, such as higher education courses at the college and university level, the methods are also applicable to other situations in which members ranging from a few to many in number are attending a gathering. For instance, the methods may be used for business meetings, professional conferences, community organizations, training sessions, and court-ordered and employer-required meetings. Thus, references to a professor, instructor, or teacher in the embodiments described herein are applicable to a leader, manager, or organizer of other types of groups. Similarly, references to a student in a class are applicable to members or participants of other types of groups or audiences that attend a session hosted by a leader.

In this disclosure, the term mobile device refers to a portable computing device, for example and not limitation, a smartphone, tablet, laptop, smartwatch or other wearable computer device. The methods herein may be implemented on mobile devices or on non-mobile devices such as a stationary desktop computer, a kiosk, or an interface screen built into a desk or workstation. User interface screens described herein may apply to a web application or to a mobile operating system such as iOS™ or Android OS™.

Referring now to the drawings, FIG. 1 is a diagram of an exemplary system 100 that may be configured to perform one or more processes that can verify the presence of an attendee in an education session. The components and arrangements shown in FIG. 1 are not intended to limit the disclosed embodiments as the components used to implement the disclosed processes and features may vary. As shown, system 100 may include a first user or leader device 110, one or more student devices 120, 125, third-party server 126, network 106, and organization 108 that may include and make use of, for example, web server 117, communication server 112, local network 116, attendance verification device 120, and database 118.

In some embodiments, the classroom 170 may be a substantially enclosed space bounded by physical barriers that can include walls, a floor, a ceiling, windows, and doors. In some embodiments, a leader or classroom instructor may operate leader device 110. Leader device 110 can include one of a mobile device, smart phone, general-purpose computer, tablet computer, laptop computer, telephone, PSTN landline, small wearable device, voice command device, other mobile computing device, or any other device capable of communicating with network 106 and ultimately communicating with one or more components of organization 108 or with third-party server 126. In some embodiments, leader device 110 may include or incorporate electronic communication devices for hearing or vision impaired users. Leader device 110 may belong to or be provided by a classroom instructor, or may be borrowed, rented, or shared. According to some embodiments, leader device 110 may include a microphone and/or digital camera, a geographic location sensor for determining the location of the device, an input/output device such as a transceiver for sending and receiving data, a speaker for outputting or emitting sound signals, a display for displaying digital images, one or more processors, and a memory in communication with the one or more processors.

In some embodiments, one or more students may operate student devices 120, 125. Student devices 120, 125 can include one of a mobile device, smart phone, general-purpose computer, tablet computer, laptop computer, telephone, PSTN landline, smart wearable device, voice command device, other mobile computing device, or any other device capable of communicating with network 106 and ultimately communicating with one or more components of organization 108 or with third-party server 126. In some embodiments, student devices 120, 125 may include or incorporate electronic communication devices for hearing or vision impaired users. Student devices 120, 125 may belong to or be provide by a student, or may be borrowed, rented, or shared. According to some embodiments, student devices 120, 125 may include a microphone and/or digital camera, a geographic location sensor for determining the location of the device, an input/output device such as a transceiver for sending and receiving data, a speaker for outputting or emitting sound signals, a display for displaying digital images, one or more processors, and a memory in communication with the one or more processors. Leader device 110 is illustrated as a laptop computer, and devices 120 and 125 are illustrated as mobile phones in this embodiment. But these devices may be other types of mobile (e.g., smartphone, smartwatch, laptop) or stationary (e.g., desktop, kiosk) devices.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Third-party server 126 may comprise a computer system associated with an entity other than organization 108 and customers that perform one or more functions associated with the individual and organization 108. For example, in some embodiments, third-party server 126 may comprise a location services server that allows organization 108 to determine the location of user devices 120, 125. In some embodiments, third-party server 126 may comprise an identification server that allows organization 108 to verify the identity of the person that is using user devices 120, 125.

Organization 108 may include an entity such as a business, corporation, individual, partnership, or any other entity that provides one or more of goods, services, and consultations to individuals such as customers. As shown in FIG. 1, organization 108 may include one or more servers (e.g., 110 and 112) and computer systems (e.g., 130) for performing one or more functions associated with products and/or services that organization 108 provides. Such servers and computer systems may include, for example, web server 117, and/or communication server 112, as well as any other computer systems necessary to accomplish tasks associated with organization 108 or the needs of customers.

Web server 117 may include a computer system configured to generate and provide one or more websites or mobile applications accessible to customers. Web server 117 may have one or more processors 132 and one or more web server databases 134, which may be any suitable repository of website or mobile application data. Information stared in web server 117 may be accessed (e.g., retrieved, updated, and added to) via local network 116 and/or network 106 by one or more devices (e.g., attendance verification device 130 or user device 120, 125) of system 100. In some embodiments, processor 132 may be used to implement a website or mobile application that may provide for verifying the attendance of an attendee at an education session.

Communication server 112 may include a computer system configured to receive, process, generate, and transmit electronic communications between a leadership device 110 or a student device 120, 125. Communication server 112 may have one or more processors 142 and one or more communication databases 144, which may be any suitable repository of communication data. Information stored in communication server 112 may be accessed (e.g., retrieved, updated, and added to) via local network 116 and/or network 106 by one or more devices (e.g., attendance verification device 130) of system 100.

Local network 116 may comprise any type of computer networking arrangement used to exchange data in a localized area, such as WiFi, Bluetooth™, Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

Attendance verification device 130 may comprise one or more computer systems configured to compile data from a plurality of sources (e.g., leader device 110, student device 120, 125, web server 117, and communication server 112), correlate compiled data, analyze the compiled data, arrange the compiled data, generate derived data based on the compiled data, and storing the compiled and derived in a database such as database 118. According to some embodiments, database 118 may be a database associated with organization 108 that stores a variety of information relating to customers, transactions, and business operations.

Database 118 also may serve as a back-up storage device and may contain data and information that is also stored on, for example, databases 134, 144, 154, 260, 270, and 280. Database 118 may be accessed by attendance verification device 130 and may be used to store lists of student codes, leader codes, as well as information about users that is associated with user accounts.

Although the preceding description describes various functions of a web server 117, communication server 112, authentication device 130, and database 118, in some embodiments, some or all of these functions may be carried out by a single computing device.

According to some embodiments, system 100 may include a software program to implement some or all of the functions of the disclosed technology. For example, in some embodiments, the leader—who may also be referred to as, for example, a teacher, instructor or professor—may initiate an attendance detection activity on leader device 110, which causes a request to be sent to the attendance verification device 130 via network 106. The request may be sent, for example, via the internet or through an internal network of the educational institution. Attendance verification device 130 may create and send instructions for generating a unique sound for the education session (e.g. a class period) to the leader's device 110. In some embodiments, the sound is a human-inaudible acoustic sound. In some embodiments, the sound is a codified sound in which a code is embedded within the acoustic signal.

Using the information or instructions sent by the attendance verification device 130, the leader's device 110 generates the unique sound. The leader's device 110 may emit the unique sound using a speaker system built into the device 110. Alternatively, an auxiliary speaker may be used instead of or in addition to leader device 110. According to some embodiments, student devices 120 located within the classroom 170 detect and receive the sound, such as by using a microphone built in to their device 120. The student devices 120 may then process the sound to extract a code for validation. In some embodiments, the attendee code that was demodulated from the sound signal received by a device 120 is validated on the device 120, such as using the software application installed on the device 120 (see FIG. 11). In other embodiments, the devices 120 can send the code to the attendance verification device 130 for validation via a transmission which may be, for example, through an internet connection or a cellular network (see FIG. 12). Devices 125 outside the classroom are unable to hear or receive the sound since the acoustic signal is unable to penetrate the physical barriers of classroom 100. But device 125 may attempt to validate the code and/or send the code via a transmission 144 to the attendance verification device 130 for validation. The attendance verification device 130 may determine if the attendee codes extracted by the devices 120 and 125 match the leader code that was incorporated in the unique sound emitted by the leader device 110.

Responsive to determining that a code from device 120 or 125 matches the leader code, attendance verification device 120 determines if the student associated with the device 120, 125 is in the room 100. If so, the database is updated, and the leader and student are notified. If the attendance verification device 130 determines that the code from device 120 or 125 does not match the leader's code, then the member is determined to not be in the room, and the leader is notified that the student associated with the invalid signal is not present. In some embodiments, if the device 120 or 125 does not send an attendee code to the attendance verification device 130 after expiration of a predetermined time period since leader device 110 emitted the sound, then the member is determined not to have been in the room or in attendance in the session.

According to some embodiments, the sound signals for verifying the presence of an attendee in an education session are inaudible frequencies that use higher and/or lower frequencies outside the average human hearing range. For example, frequencies above 20 kHz or less than 20 Hz may be used. Using an inaudible frequency prevents attendees from recording the sound in attempts to falsify their attendance. In some embodiments, the sound signal emitted by leader device 110 can be altered during the education session to improve security in the verification process. For example, in some embodiments, the sound signal can be a tone having a discrete time length, where the tone is changed at regular intervals (e.g., every 30 seconds). In another example, the sound signal can be a continuously emitted tone that varies during the emission. In yet another example, the leader can use different sound signals at different time points during the education session. In various embodiments, the composition of the signal can be the same for different sessions, or may be uniquely randomized based on the room, the leader, the time or other factors. Having an authentication sound signal that is always changing makes it more difficult for attendees to create a fake signal for verification, such as by recording it and sending it to another attendee.

In some embodiments, a notification sound having an audible frequency, such as 15 kHz-20 kHz, can be emitted prior to or while emitting the codified sound. This notification sound alerts the instructor that the verification sound signal is about to begin or is currently active. For example, according to some embodiments, the notification sound can be emitted continuously or intermittently while the codified sound is on.

The distance range that the emitted sound signal travels varies based on the strength of the device's speakers and volume level. Auxiliary speakers can be used to increase the range of the signal, such as to cover large lecture halls. Thus, the distance that the sound signal travels can be customized for the particular room being used, which helps to prevent people who are outside the room from receiving the signals.

Using sound signals as an authentication tool provides many advantages. Sound transmission is affected when it passes through objects. This means a room's walls, floor, and ceiling limit the signal and can only be heard from inside the room. Thus, a member directly outside of the meeting location cannot hear the signal. Sound signals become weaker, and thus cannot be received, the further the distance between the device emitting the signal and the device receiving it. But sound bounces off physical objects and thus can still reach the far edges of a room by bouncing off walls, ceilings, and objects such as human bodies, desks and chairs that block the direct path of the signal. If the meeting location is not completely sealed or enclosed due to having open areas such as a window, or if it does not have walls or a ceiling, the signal could be transmitted outside the meeting location. In such instances, the volume or the hardware used to emit the tone (e.g., type of speaker) can be adjusted to accommodate the configuration of the room, such as by decreasing the volume to limit the distance that the sound signal travels and thus preventing the sound signal from traveling beyond the boundaries of the room.

Figure 2:
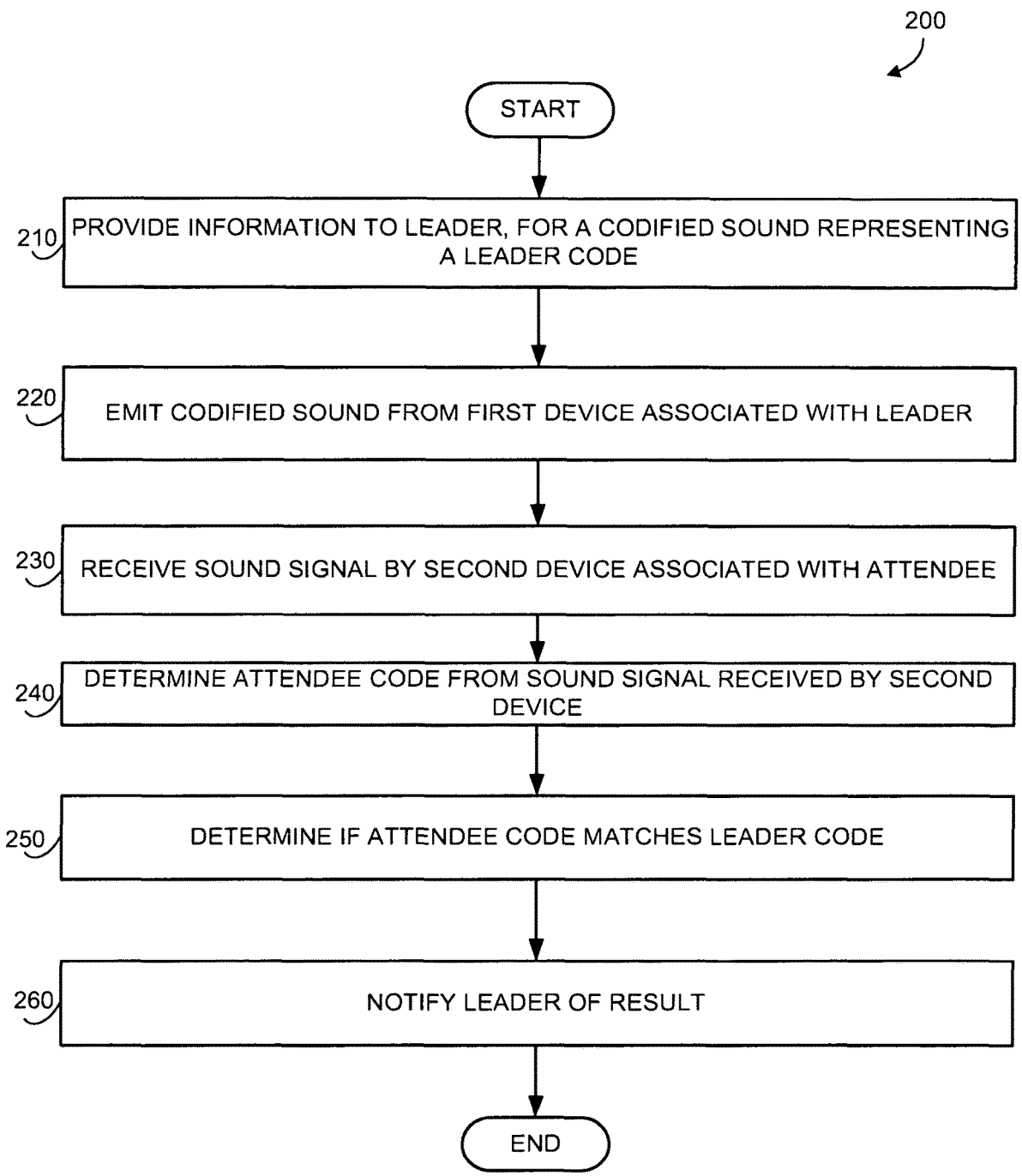
FIG. 2 is a flowchart for verifying participation in an education session, according to some embodiments.

FIG. 2 is a flowchart of a method 200 for verifying participation in an education session, in accordance with embodiments of the present disclosure. As shown, information for a codified sound is provided 210 to a leader of an education session, where the leader is located in a substantially enclosed space in which the education session is held. The substantially enclosed space is bounded by physical barriers, where the physical barriers deter or prevent the codified signal from being emitted beyond the substantially enclosed space. In some embodiments, the information for the codified sound can be provided 210 to the leader via an internet connection or a cellular network or other appropriate communication system. The information can include, for example, a numerical code (leader code) and a mapping of frequencies to numerical values in the numerical code. The leader code serves as an authentication code for the class session, room, or professor, or other category.

As shown, the codified sound is emitted 220 from first device 110 associated with the leader, and a sound signal is received 230 by second device 120 associated with an attendee of the education session. Second device 120 demodulates 240 the sound signal to determine an attendee code based on the sound signal received by second device 120. As shown in FIG. 2, it is then determined 250 whether the attendee code matches the leader code. This determination (or "validation") 250 can be performed, for example, on second device 120 (e.g., by an application executing on second device 120) or by the computer hardware processor of the overall system (i.e., attendance verification device 130).

Finally, the leader is notified 260 of the outcome of the verification. When the code matches the leader code, the leader is notified that the attendee is present within the substantially enclosed space. When the code does not match the leader code, or when the code is not received within a permitted period of time after first device 105 (i.e., the leader's device) emits the sound, the leader is notified that the attendee is not present within the substantially enclosed space. In some embodiments, if the code is verified to match the leader code, the attendee is allowed to receive content for the education session. The content may be sent to the attendee, such as to second device 110 (i.e., the device associated with the attendee), without the use of any codified sound signals. That is, in some embodiments the sound signal can be used for attendance verification only, and the sound signals are not required for the transmittal of notes, polls, quizzes, or other content of the education session. For example, the content may be sent to the attendees via network 206 (e.g., via an internet connection) from, for example, web server 117 or communication server 112.

In some embodiments, the codified sound is a human-inaudible acoustic signal. For example, the codified sound can have a frequency of above 20 kHz or less than 20 Hz. In some embodiments, the method may also include emitting a notification sound having an audible frequency, prior to or while emitting the codified sound. In some embodiments, the emitting of the codified sound includes altering the codified sound during the education session. In some embodiments, the codified sound includes a modulated code, and processing of the sound signal by the second device to determine the attendee code comprises demodulating numerical values associated with frequencies in the sound signal. In some embodiments, the emitting comprises adjusting a volume of the codified sound according to a size of the substantially enclosed space. In some embodiments, the emitting comprises using an auxiliary speaker with the first device, to adjust a distance range of the codified sound according to a configuration of the substantially enclosed space (e.g., size of the room or composition of the physical barriers that bound the room).

Further embodiments of the present methods include receiving additional content from the leader's device; processing the content; and transmitting the content to devices associated with a group of leaders or to a plurality of devices associated with a group of members. This content may be, for example, attendance information or assessment results to be sent to other leaders in a department, or syllabus changes of which students are being notified. Embodiments may also include receiving and sending private messages between at least some of the group of members and the leader, where the group of members is associated with the leader, and the private messages are only sent between the group of members and the leader.

Figure 3:
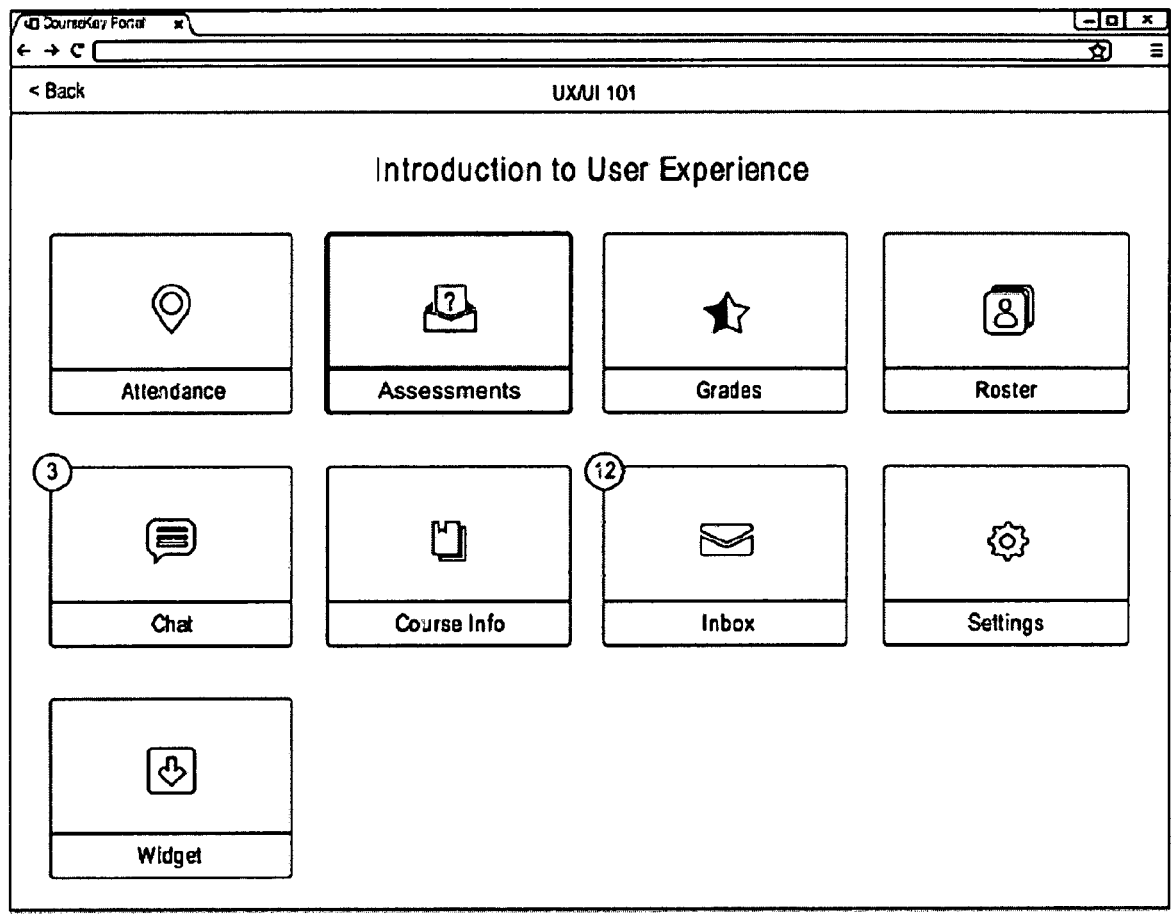
FIG. 3 shows a home page for an audience member, according to some embodiments.

FIG. 3 shows an example menu screen of a software application of the present methods, embodied as a home page of a leader interface (e.g., a professor). The menu in this embodiment is configured for a web application and includes the following items: attendance, assessments, grades, roster, chat, course info, inbox, settings, and widget. The "Attendance" tab allows a leader to enable attendance check-in for a meeting, and to view attendance statistics. The "Assessments" tab allows creation of assessments, such as quizzes, where in some embodiments the audience member's location is verified when responses are submitted. The "Grades" tab allows the leader to view and manage grades. The "Roster" tab provides the leader with a listing of participants in the meeting. "Chat" allows a leader to converse with audience members. "Course info" allows the leader to manage information about the meeting or course. For example, for an academic course, a professor may input a course name, course title, course description, schedule number, and dates and times for the class. "Inbox" is a menu for email messages. "Settings" allows the leader to customize their settings such as their login information and viewing preferences. "Widget" enables the leader to run functions as a separate application, such as performing an assessment quiz without having the web page open for the full software application.

Figure 4:
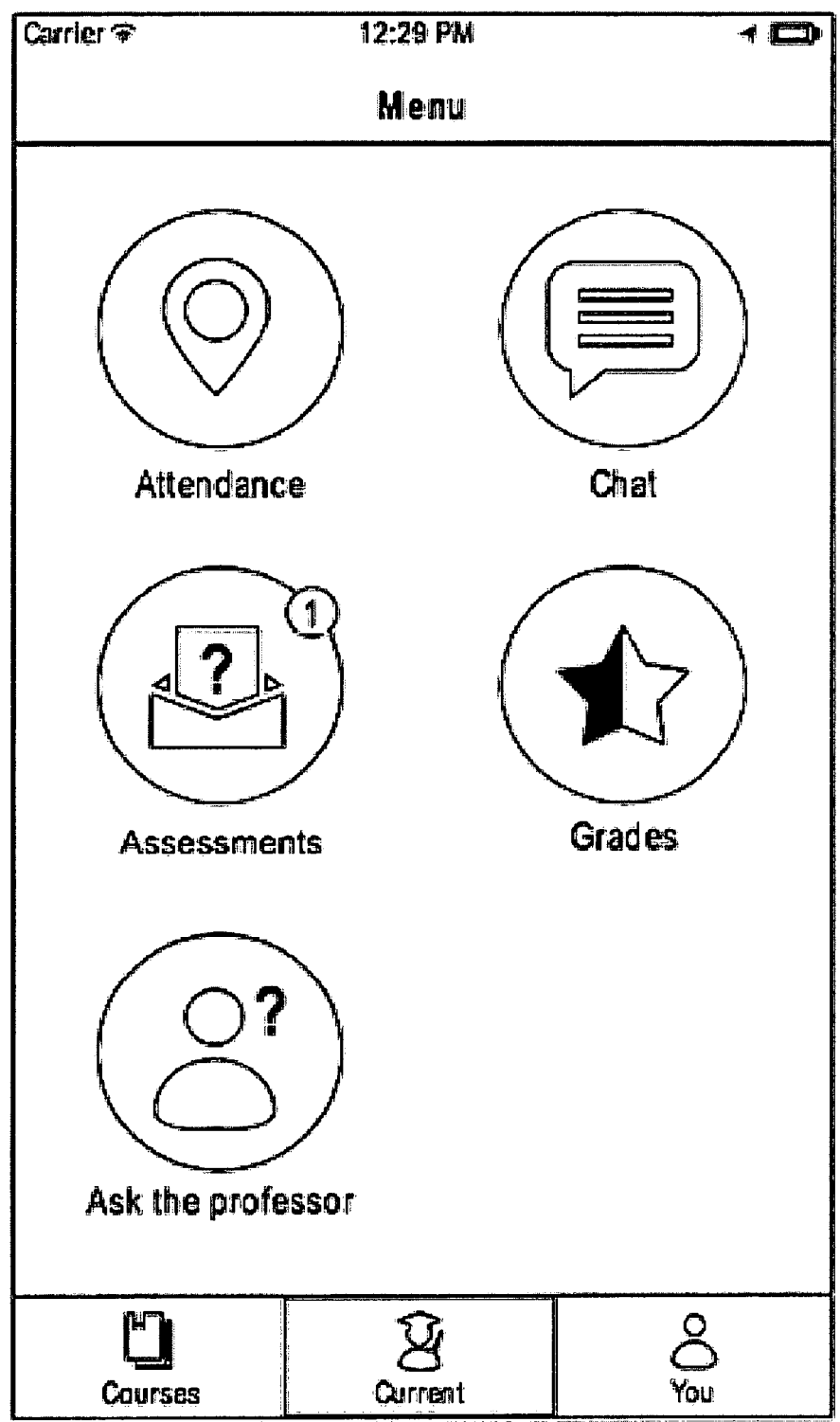
FIG. 4 shows a home page of a leader interface, according to some embodiments.

FIG. 4 shows a home page for an audience member (e.g., a student). The home page in this embodiment is configured for a mobile device, where the audience member is a student in a class. The tabs at the bottom of the screen are Courses, Current and You. The "Courses" tab may show a listing of the courses in which the student is enrolled, along with information for each course such as the instructor's name, class hours, classroom number, lab hours, office hours, professor's contact information, and a payment portal. The "Current" tab—as shown in FIG. 4—includes buttons for attendance, chat, quizzing, grades, and ask the professor in this embodiment. The "You" tab may include items for, as an example, managing the student's school information, managing their account, querying for help questions, contacting a support center, viewing terms and policies, and logging out. Further combinations and arrangements of the menu items in FIGS. 3 and 4 are possible, while remaining within the scope of this disclosure.

When a student is logging into a class for the first time, in some embodiments the student may be asked to input a unique registration code. In other embodiments, the student simply sets up a login account. After logging in, the student selects a class for which to register, and clicks a "register" button or similar prompt to submit their information for that class. They are then registered in the class and able to access data corresponding to the class any time throughout its course. In subsequent sessions with the software application, students see a "Select a Class" list after logging in, where they choose a class for which they have already registered.

Figure 5:
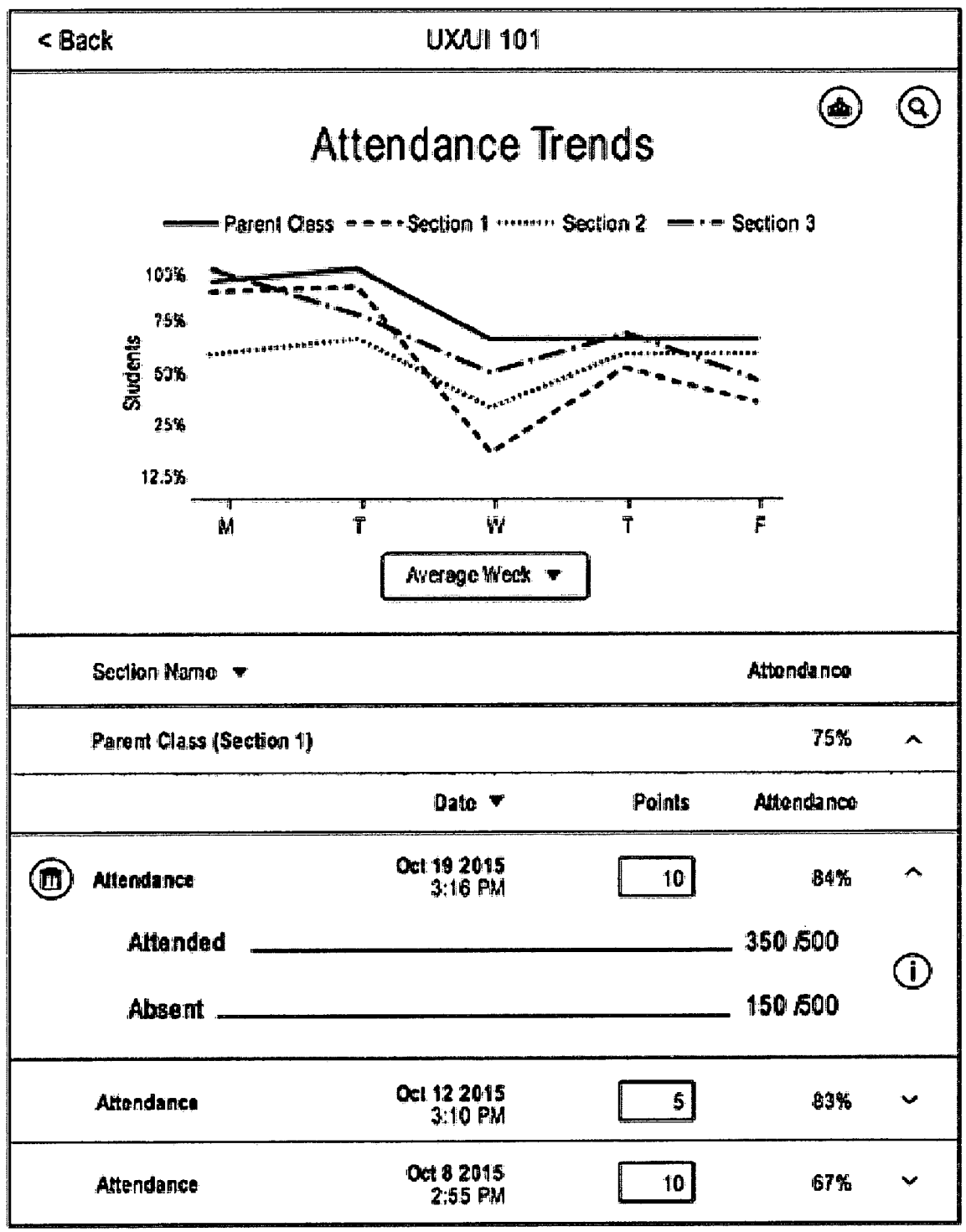
FIG. 5 shows a leader's attendance screen for an academic class, according to some embodiments.
Figure 6:
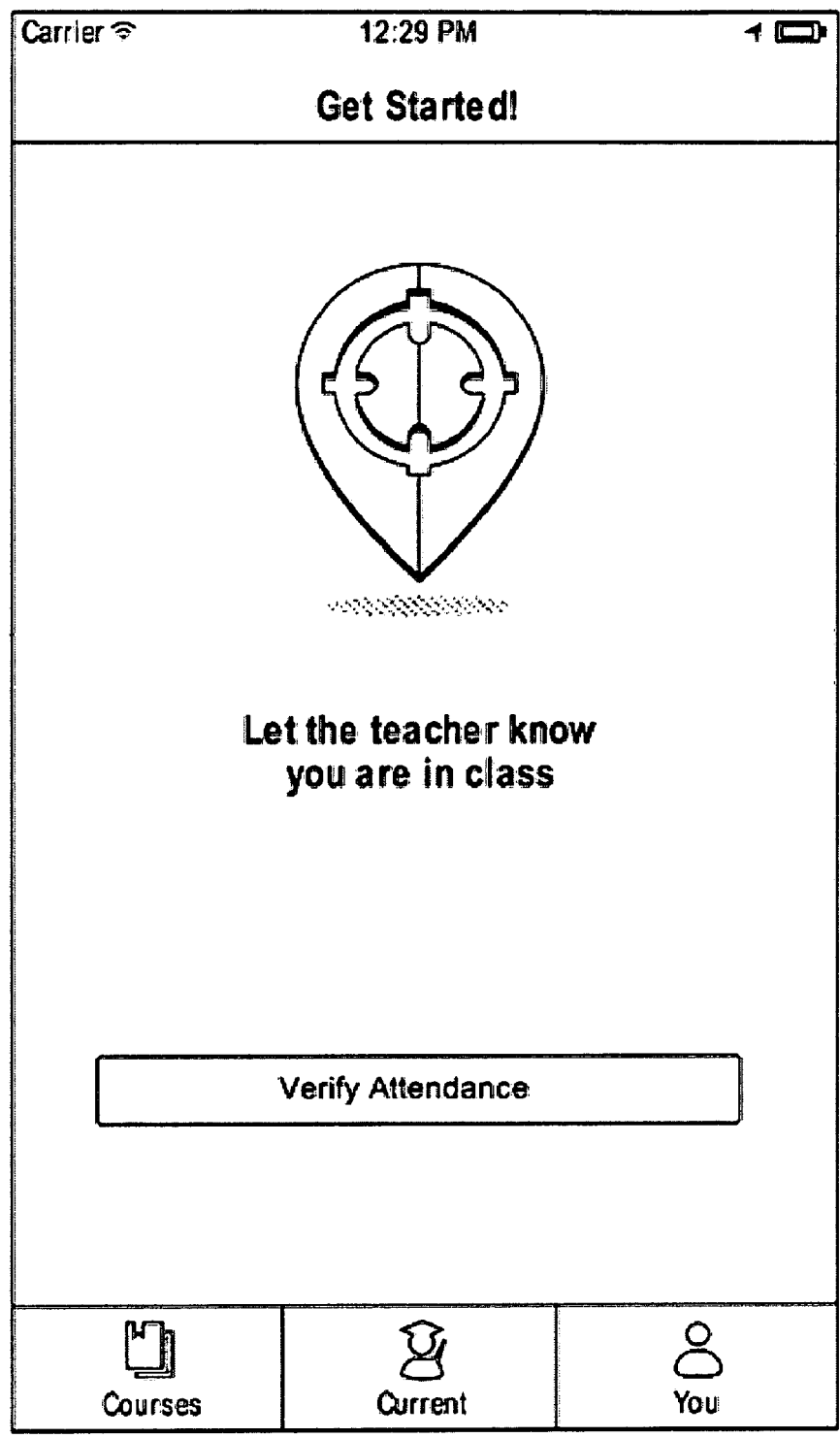
FIG. 6 shows a screen where a user's device is prompted to enable attendance verification, according to some embodiments.

FIG. 5 shows an example of a leader's attendance screen for an academic class, where the teacher can view attendance trends and statistics for specific dates in this embodiment. Attendance is recorded by students indicating their presence through a check-in screen on their mobile or stationary device. The student opens the software application, where the leader has enabled attendance information to be entered, and the student is prompted to click a "check-in" button to record that they are present at the class. The student may be given a certain time period to respond. The student's device may be prompted to receive an authentication signal as shown in FIG. 6 to perform the location verification. The students' locations are checked for whether they are within a designated class area when check-in information by the students is processed by the system. In some embodiments, the attendance verification may be performed within various stages of the session, such as at the beginning of a class, before an assessment is performed, or at a random time point.

Figure 7:
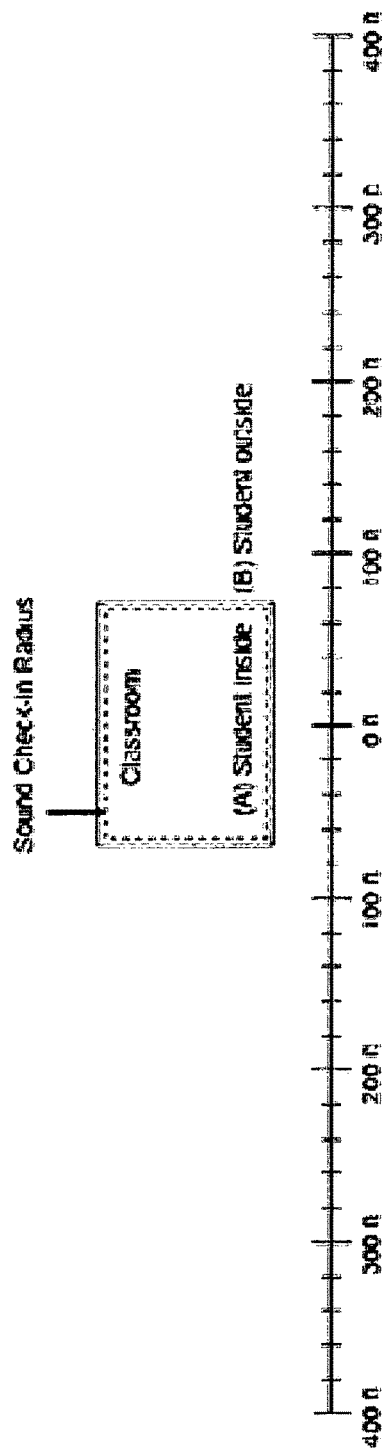
FIG. 7 is a schematic of detection range using sound verification, according to some embodiments.

FIG. 7 demonstrates the reliability of using sound verification. A classroom is shown, where student (A) is inside the classroom and student (B) is outside. The check-in radius of the sound signal is limited to the boundaries of the enclosed classroom space, since the sound signal cannot penetrate the walls, ceiling, and floor of the room. The range of the sound signal can be tailored to the size of the room by adjusting, for example, the volume or frequency, or by changing the sound-emitting hardware such as by adding or omitting the use of auxiliary speakers to transmit the sound.

Figure 8:
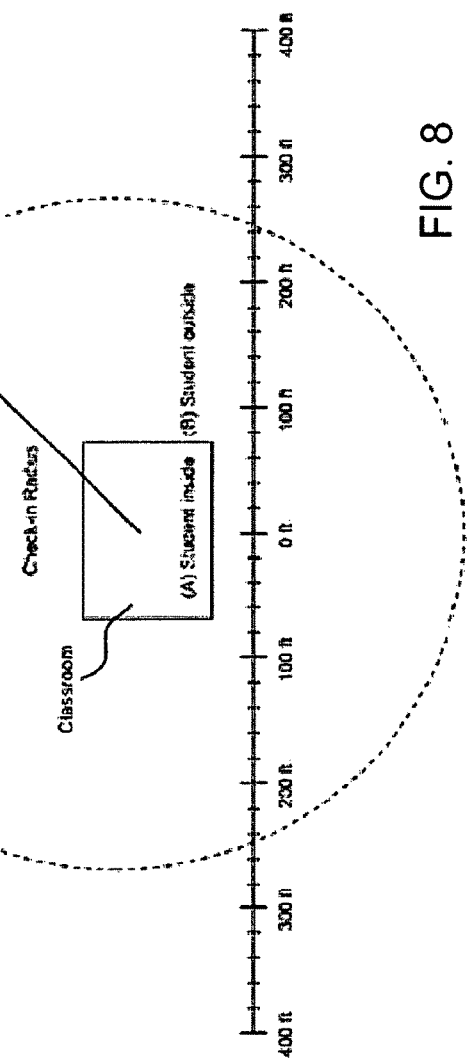
FIG. 8 is a schematic of detection range for conventional technologies.

In contrast, FIG. 8 shows a check-in radius that can result from conventional technologies, where the radius extends outside the classroom. For example, Bluetooth™ signals can penetrate walls, and thus it is not possible to guarantee that a student who has received a Bluetooth™ signal is in the room. Similarly, peer-to-peer networks use internet networks that are not confined to the space of a room and can even cover an entire campus. Global positioning sensors can be used to check the coordinates of a student's location. But GPS readings sometimes are inaccurate and thus can result in a false indication that a student's coordinates overlap with the meeting location. Consequently, in the present methods, the limited range of sound signals provides a more reliable method compared to these conventional technologies for verifying a member's participation in an education session. Furthermore, Bluetooth™ and GPS are not always available on an electronic device while speakers and microphones are included in most electronic devices. Consequently, the present sound signal verification techniques can be more accessible or easier to implement than conventional techniques.

In some embodiments, the codified sound may involve a modulated code. For example, subsets of frequencies may be assigned binary values of 0 or 1. A computer hardware system (e.g., server) can generate the leader code made of the 0's and 1's, and after receiving the code, the leader's device can modulate the code and the assigned frequencies into a sound signal. An attendee's device receives the generated sound signal, and processes the sound by demodulating the code. In another example, certain frequencies may be assigned numerical values of 0, 1, 2, 3, etc. A computer hardware system generates the leader code made of the numerical values, and the leader's device generates a sound signal based on the frequencies mapped to the numerical values of the leader code. As a sample scenario, an attendance session may have a unique numeric code (i.e., a leader code) created by the server, such as "11354" or "98642." Each numeric value of the code is translated into a frequency, such as associating "1" with a certain frequency and "4" with another frequency. The entire numeric code becomes a unique frequency melody. This melody is the codified signal the instructor's device emits. The student's device can listen for the codified sound and deconstruct the frequency melody into the numeric code.

Figure 9:
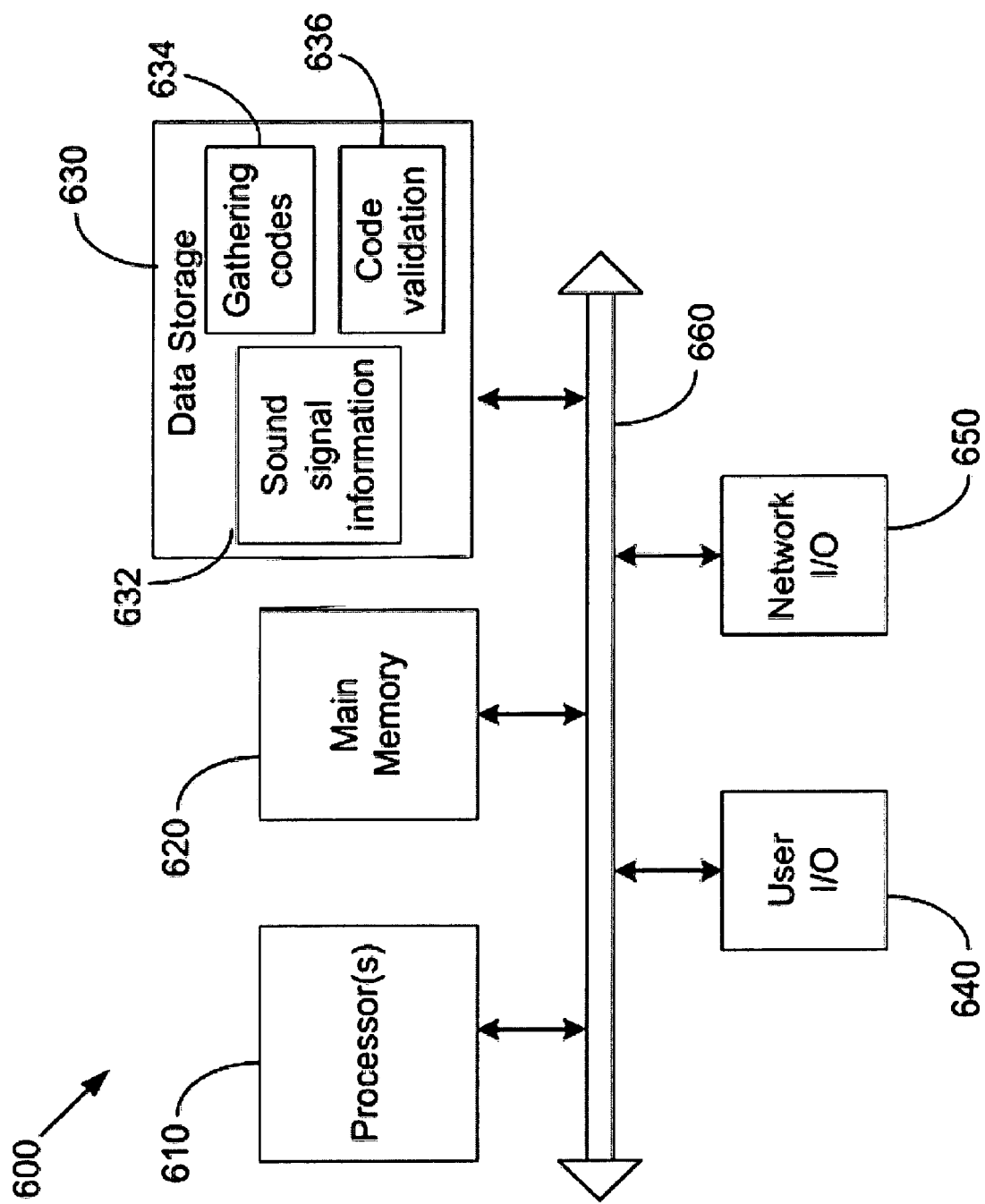
FIG. 9 is a simplified schematic diagram of a computer hardware device, according to some embodiments.

FIG. 9 is a generalized schematic diagram of a computer hardware device 600 that may be used to perform some of the steps of the method 200 shown in FIG. 2. The computer hardware device 600 may be, for example, a server on which the software application system and/or database is housed (e.g., attendance verification device 130 of FIG. 1). Computer hardware device 600 generally includes at least one computer hardware processor 610, a main memory 620, a data storage 630, a user input/output (I/O) 640, and a network I/O 650, among other components not shown for simplicity, connected or coupled together by a data communication subsystem 660. Other embodiments may use other components and combinations of components. For example, the device 600 may represent one or more physical computer devices, such as web servers, network storage devices, etc. In some embodiments, the device 600 may be implemented at least partially in a cloud network. The computer hardware processor 610 represents, in various embodiments, a single processing device or computing device, more than one processing device in a single computer, or more than one computer, server, or computing device.

The main memory 620 represents one or more random access memory modules (RAM) modules on one or more printed circuit boards (PCBs) in one or more housings or enclosures. The data storage 630 represents any appropriate number or combination of internal or external physical mass storage devices, such as hard drives, optical drives, network-attached storage (NAS) devices, flash drives, etc. The user I/O 640 represents one or more appropriate user interface devices, such as keyboards, touch screens, pointing devices, displays, etc., which may be present on a mobile or stationary device. The network I/O 650 represents any appropriate networking devices, such as network adapters, etc. for communicating through the network. The data communication subsystem 660 represents any appropriate communication hardware for connecting the other components in a single unit or in a distributed manner on one or more PCBs, within one or more housings or enclosures, within one or more rack assemblies, etc.

The data storage 630 stores the non-transitory computer-readable medium for executing the steps of the present methods, which are loaded into the main memory 620 and run by processor 610. The non-transitory machine-readable medium includes instructions executable by a computer processor, the instructions causing the computer processor to perform steps such as those in the flowcharts of the present disclosure. Data storage 630 may include modules pertaining to, for example, providing sound signal information 632 for providing a leader code and generating a codified sound signal representing the leader code, gathering codes 634 from attendee's devices, and validating codes 636 to determine if received codes match the leader code and whether a code is even received from an attendee's device. These units are shown for example only, and do not limit or exclude other configurations of data storage 630.

Figure 10:
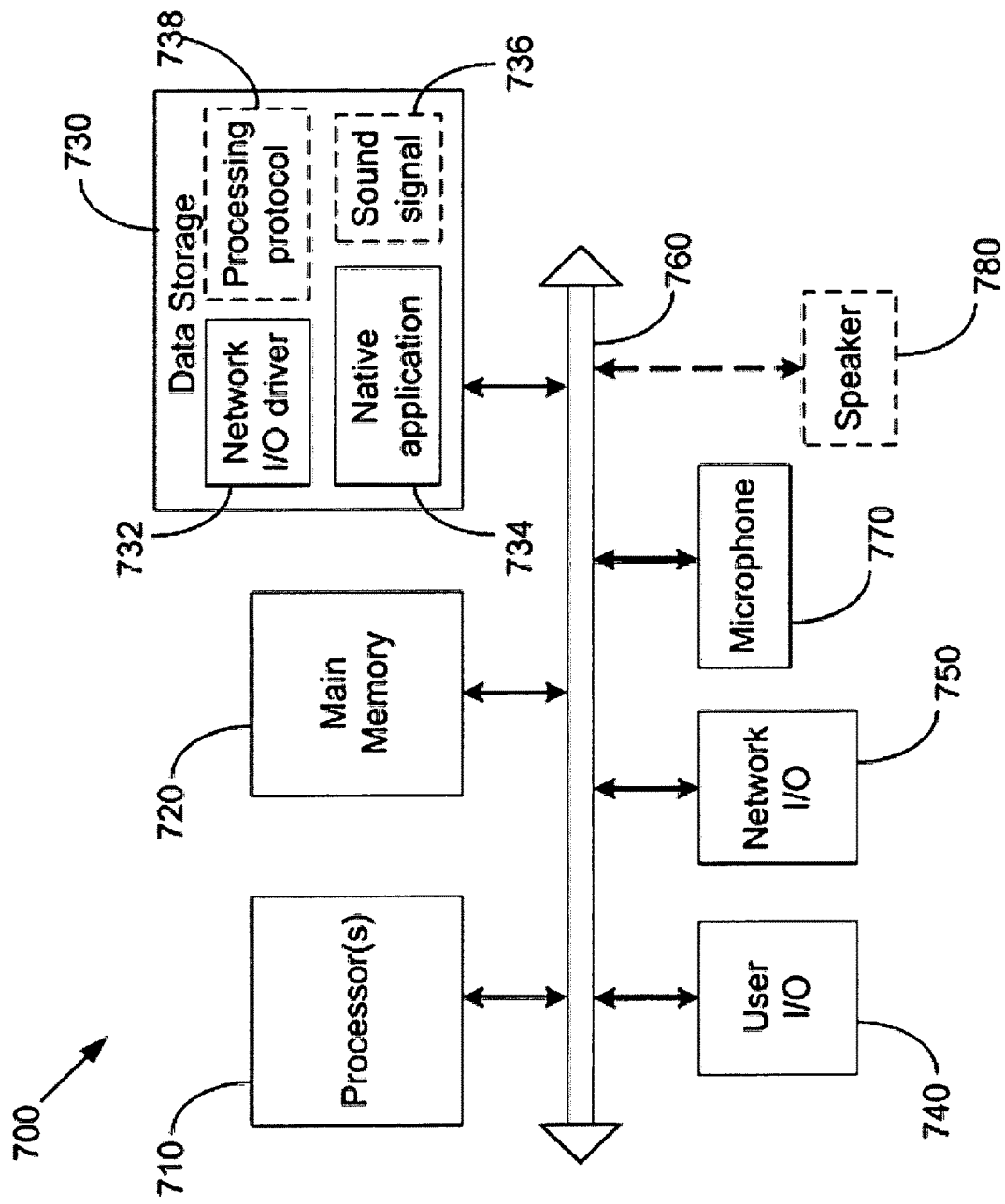
FIG. 10 is a simplified schematic diagram of a member's device, according to some embodiments.

FIG. 10 shows a simplified schematic diagram of an electronic device 700 associated with a member or a leader (e.g., attendee devices 120 or 125, or leader device 110), which may be a mobile device such as a smartphone, tablet, or laptop, or may be a stationary device such as a desktop computer. Device 700 generally includes at least one computer hardware processor 710, a main memory 720, a data storage 730, a user input/output (I/O) 740, and a network I/O 750, among other components not shown for simplicity, connected or coupled together by a data communication subsystem 760. Device 700 also includes a microphone (or other sound receiving device) 770 for receiving sound signals, and optionally a speaker 780 for emitting sound.

Data storage 730 may include, for example, network input/output driver 732, a native application 734 that runs the software application of the present methods, a sound signal generation protocol 736 (for a leader's device) which generates a codified sound using information provided by the computer hardware system of FIG. 9, and processing protocol 738 (for an attendee's device) that determines a code from sound signals received by microphone 770. The units in data storage 730 are loaded into the main memory 720 and run by processor 710. The units illustrated are provided as examples only, and do not define or limit the extent of data storage 730.

Figure 11:
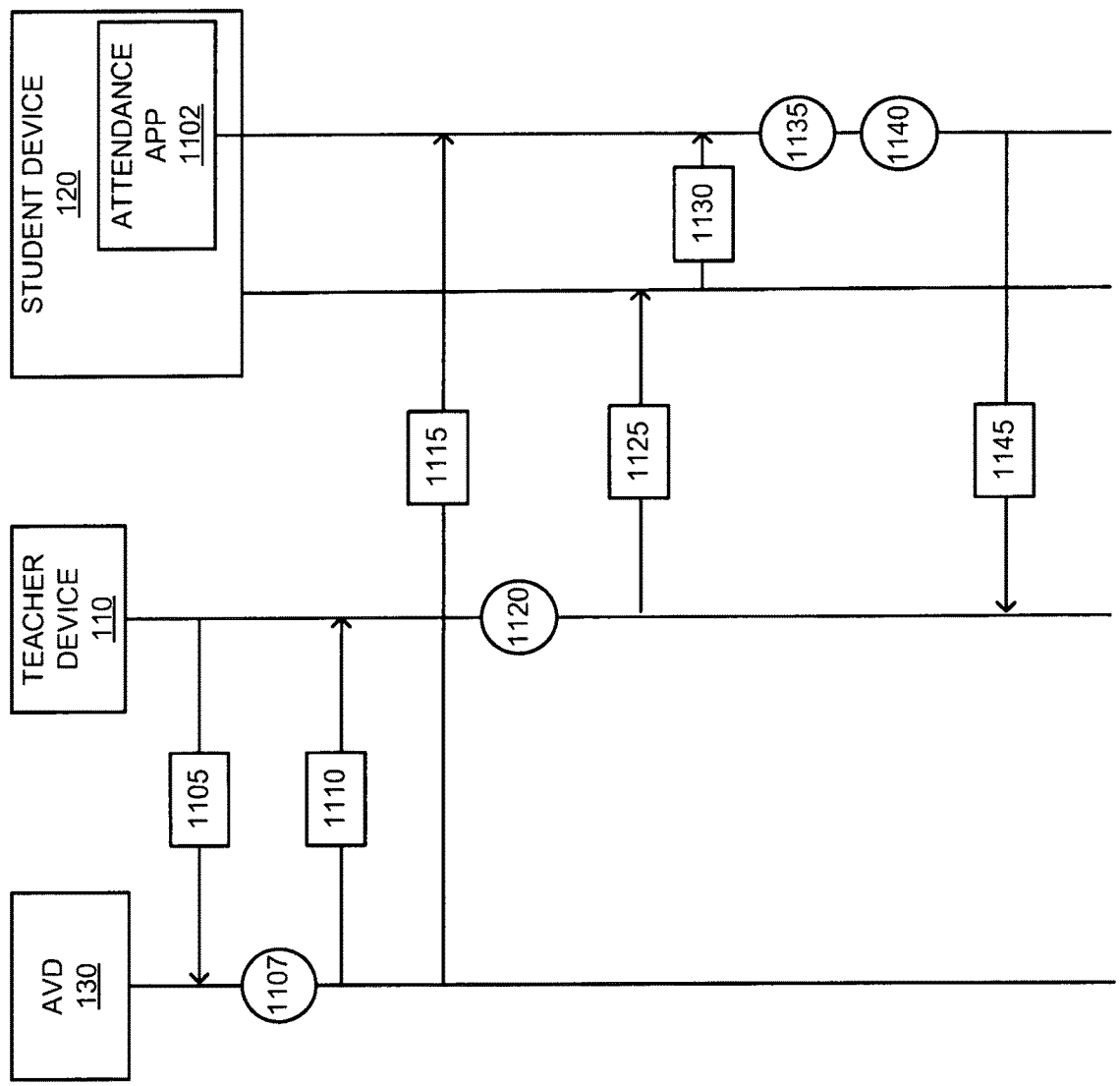
FIG. 11 is a diagram illustrating data flow and processes carried out by components involved in attendance verification processes of the disclosed systems and methods, according to an example embodiment.

FIG. 11 is a diagram illustrating data flow and processes 1100 carried out by components involved in attendance verification processes of the disclosed systems and methods, according to an example embodiment. As shown, in some embodiments, when an instructor indicates it is time to initiate a class session and take attendance, teacher device 110 can send a message to attendance verification device 130 requesting 1105 to initiate attendance detection activity. Attendance verification device 130 may create 1107 instructions for generating a unique sound for the class along with an attendance verification code. Attendance verification device 130 may then output 1110 for delivery to teacher device 110 the instructions and code and output 1115 for delivery to attendance application 1102, which is executing on student device 120, the code.

As further shown in FIG. 11, once teacher device 110 receives the instructions and the code, teacher device 110 can modulate 1120 the code to a sound signal to be transmitted to, for example, student device 120. Teacher device 110 can then output 1125 the sound signal, which, upon receipt by student device 120, can be passed 1130 to attendance application 1102. As will be understood, in an example embodiment, a microphone associated with student device 120 can receive the sound signal, an attendance application 1102 can be configured to receive data indicative of signals received by the microphone.

Once attendance application 1102 receives data indicative of the sound signal, it can demodulate 1135 the signal to extract the attendance code and then compare 1140 the extracted code to the code previously received from attendance verification device 130. Upon determining that the codes match, thereby verifying attendance, student device 120 can output 1145 a verification notification to teacher device 110. Additionally, though not shown, one of teacher device 110 or student device 120 could also output a verification notification to attendance verification device 130, according to some embodiments.

Figure 12:
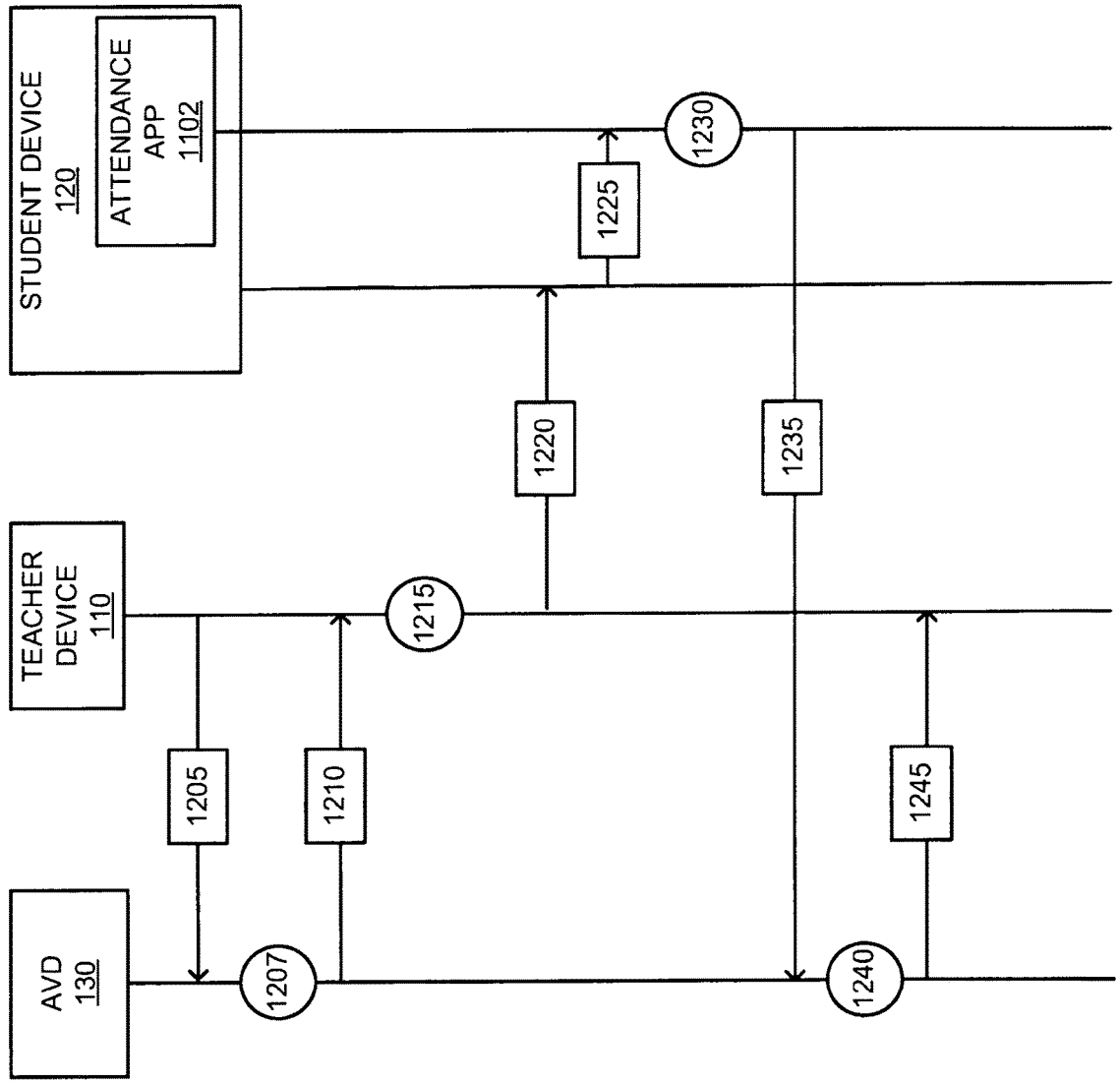
FIG. 12 is a diagram illustrating data flow and processes carried out by components involved in attendance verification processes of the disclosed systems and methods, according to an example embodiment.

FIG. 12 similarly is a diagram illustrating data flow and processes 1200 carried out by components involved in attendance verification processes of the disclosed systems and methods, according to an example embodiment. As shown in FIG. 12, in some embodiments, when an instructor indicates it is time to initiate a class session and take attendance, teacher device 110 can send a message to attendance verification device 130 requesting 1205 to initiate attendance detection activity. As before, attendance verification device 130 may create 1207 instructions for generating a unique sound for the class along with an attendance verification code. Attendance verification device 130 may then output 1210 for delivery to teacher device 110 the instructions and code, but not send anything to attendance application 1102.

As further shown in FIG. 12, and as was discussed in relation to FIG. 11, once teacher device 110 receives the instructions and the code, teacher device 110 can modulate 1215 the code to a sound signal to be transmitted to, for example, student device 120. Teacher device 110 can then output 1220 the sound signal, which, upon receipt by student device 120, can be passed 1225 to attendance application 1102, as discussed above. Once attendance application 1102 receives data indicative of the sound signal, it can demodulate 1230 the signal to extract the attendance code and then output 1235 the extracted code to attendance verification device 130, which can compare 1240 the extracted code to the generated code and, upon determining that the codes match, thereby verifying attendance, attendance verification device 130 can can output 1245 a verification notification to teacher device 110.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of verifying presence of an attendee at an education session, the method comprising:
providing, by a computer hardware processor, information for a codified sound to a leader of the education session, wherein the leader is located in a substantially enclosed space in which the education session is held, and wherein the codified sound represents a leader code;
emitting the codified sound from a first device associated with the leader;
receiving a sound signal, by a second device associated with the attendee;
determining, by the second device, an attendee code from the sound signal received by the second device; and
determining whether the attendee code matches the leader code.

2. The method of claim 1, wherein the codified sound is a human-inaudible acoustic signal.

3. The method of claim 1, wherein the codified sound has a frequency above 20 kHz or less than 20 Hz.

4. The method of claim 1, further comprising emitting a notification sound having an audible frequency, prior to or while emitting the codified sound.

5. The method of claim 1, wherein the emitting comprises altering the codified sound during the education session.

6. The method of claim 1, wherein the codified sound includes a modulated code.

7. The method of claim 6, wherein the determining of the attendee code comprises demodulating numerical values associated with frequencies in the sound signal.

8. The method of claim 1, further comprising notifying the leader that the attendee is present within the substantially enclosed space when the attendee code matches the leader code.

9. The method of claim 1, further comprising notifying the leader that the attendee is not present within the substantially enclosed space when the attendee code does not match the leader code or when the attendee code is not received in a permitted period of time.

10. The method of claim 1, further comprising allowing the attendee to receive content for the education session after the attendee code is verified to match the leader code, wherein the content is sent to the attendee without use of any codified sound signals.

11. The method of claim 1, wherein the providing and the sending are performed via an internet connection or a cellular network.

12. The method of claim 1, wherein the substantially enclosed space is bounded by physical barriers, wherein the physical barriers deter the codified sound from being emitted beyond the substantially enclosed space.

13. The method of claim 1, wherein the emitting comprises adjusting a volume of the codified sound according to a size of the substantially enclosed space.

14. The method of claim 1, wherein the emitting comprises using an auxiliary speaker with the first device, to adjust a distance range of the codified sound according to a configuration of the substantially enclosed space.

* * * * *